(12) United States Patent
Riley

(10) Patent No.: US 8,024,783 B2
(45) Date of Patent: Sep. 20, 2011

(54) MODULAR AGENT ARCHITECTURE

(76) Inventor: Ryan Riley, Meridian, ID (US)

( * ) Notice: Subject to any disclaimer, the term of this patent is extended or adjusted under 35 U.S.C. 154(b) by 840 days.

(21) Appl. No.: 11/223,906

(22) Filed: Sep. 8, 2005

(65) Prior Publication Data

US 2006/0143604 A1 Jun. 29, 2006

Related U.S. Application Data

(63) Continuation-in-part of application No. 10/763,808, filed on Jan. 22, 2004, now abandoned, and a continuation-in-part of application No. 10/763,814, filed on Jan. 22, 2004.

(51) Int. Cl.
H04L 9/32 (2006.01)
H04L 9/00 (2006.01)
G06F 7/04 (2006.01)

(52) U.S. Cl. ............ 726/6; 726/2; 726/4; 726/5; 726/26; 713/182; 713/183; 713/184; 713/185; 713/187

(58) Field of Classification Search ................ 726/6
See application file for complete search history.

(56) References Cited

U.S. PATENT DOCUMENTS

| | | |
|---|---|---|
| 5,603,032 A | 2/1997 | Attal |
| 6,052,531 A | 4/2000 | Waldin |
| 6,119,165 A | 9/2000 | Li et al. |
| 6,199,204 B1 | 3/2001 | Donohue |
| 6,425,126 B1 | 7/2002 | Branson et al. |
| 6,606,744 B1 | 8/2003 | Mikurak |
| 6,886,024 B1 | 4/2005 | Fujita et al. |
| 2002/0124181 A1 | 9/2002 | Nambu |
| 2003/0023963 A1 | 1/2003 | Birkholz et al. |
| 2003/0033448 A1* | 2/2003 | Kieffer .......................... 709/331 |
| 2003/0177389 A1* | 9/2003 | Albert et al. .................. 713/201 |

FOREIGN PATENT DOCUMENTS

| | | |
|---|---|---|
| JP | 6259358 | 9/1994 |
| JP | 2002517814 | 5/1998 |
| JP | 11184700 | 7/1999 |
| JP | 11272454 | 10/1999 |
| JP | 2001125872 | 5/2001 |
| JP | 2002007129 A | 1/2002 |
| JP | 2002259150 | 9/2002 |
| JP | 2003256370 | 9/2003 |
| JP | 2003288321 | 10/2003 |
| JP | 2004158012 A | 6/2004 |
| JP | 2004246880 A | 9/2004 |
| JP | 2005532606 | 10/2005 |

(Continued)

OTHER PUBLICATIONS

European Search Report, EP 06 80 3293, mailed Dec. 8, 2008.

(Continued)

Primary Examiner — Longbit Chai
(74) Attorney, Agent, or Firm — Nixon Peabody LLP

(57) ABSTRACT

An agent architecture may be provided with base functionality that allows it to run without executing any applications. The base application need not have any modules. When functionality is desired, modules may be added. The agent may receive policies and procedures from a controller, and executes the modules based on the policies and procedures. It may then return and report information. This allows a system to be designed that doesn't have to be recompiled upon changes to individual tasks or applications, which greatly eases development of new tasks and applications.

14 Claims, 2 Drawing Sheets

FOREIGN PATENT DOCUMENTS

| WO | 9963430 A1 | 12/1999 |
|---|---|---|
| WO | 0241141 | 5/2002 |
| WO | 0225438 | 3/2003 |
| WO | 03058457 | 7/2003 |
| WO | 2005069911 A2 | 8/2005 |
| WO | 2005069912 A2 | 8/2005 |

OTHER PUBLICATIONS

Microsoft White Paper, "Understanding Patch and Update Management: Microsoft's Software Update Strategy", Microsoft Corporation, pp. i-iii, 1-14, Oct. 2003.

Keromytis et al., "A Holistic Approach to Service Survivability", ACM, pp. 11-22, Oct. 2003.

Sidiroglou et al., "A Network Work Vaccine Architecture", IEEE, pp. 1-6, Jun. 2003.

International Search Report, PCT/US2005/01547, dated Aug. 24, 2006.

Microsoft Corporation, "peer-to-peer architecture" definition, Microsoft Computer Dictionary, Fifth Edition, p. 397, 2002.

Network Working Group, "Hypertext Transfer Protocol—HTTP/1.1", Jun. 1999, http://www.www.ietf.org/rfc/rfc2616.txt, p. 1, 35-71.

Concepts, Planning and Deployment Guide, Microsoft Systems Management Server 2003. Microsoft Corporation. Oct. 1, 2003, pp. 72-79, 130-132.

Office Action in U.S. Appl. No. 10/763,808, mailed Dec. 4, 2006.
Office Action in U.S. Appl. No. 10/763,808, mailed Feb. 17, 2009.
Notice of Allowance in U.S. Appl. No. 10/763,808, mailed Nov. 16, 2009.
Office Action in U.S. Appl. No. 10/763,814, mailed Jul. 25, 2006.
Office Action in U.S. Appl. No. 10/763,814, mailed Feb. 8, 2007.
Office Action in U.S. Appl. No. 10/763,814, mailed Jun. 20, 2007.
Office Action in U.S. Appl. No. 10/763,814, mailed Feb. 7, 2008.
Office Action in U.S. Appl. No. 10/763,814, mailed Oct. 1, 2008.
European Office Action in European Application No. EP 05711586, mailed Oct. 15, 2010.
European Search Report in European Application No. EP 05711586, mailed Jul. 30, 2010.
International Search Report and Written Opinion in International Application No. PCT/US2005/01546, dated Sep. 24, 2007.
International Search Report and Written Opinion in International Application No. PCT/US2006/035214, dated Sep. 12, 2007.
Japanese Office Action in Japanese Application No. 2008-530003, mailed May 25, 2010.
Japanese Office Action in Japanese Application No. 2006-551195, mailed Nov. 16, 2010.
Japanese Office Action in Japanese Application No. 2006-551196, mailed Nov. 16, 2010.

* cited by examiner

MODULAR AGENT ARCHITECTURE

CROSS REFERENCE TO RELATED APPLICATION

This application is a continuation-in-part of U.S. patent application Ser. No. 10/763,808, entitled "Client-Server Data Execution Flow" by Ryan Riley, filed on Jan. 22, 2004 now abandoned and a continuation-in-part of U.S. patent application Ser. No. 10/763,814, entitled "Distributed Policy Driven Software Delivery" by Anthony F. Gigliotti and Ryan Riley, filed on Jan. 22, 2004.

FIELD OF THE INVENTION

The present invention relates to the field of computer software. More specifically, the present invention relates to a modular architecture for agent software.

BACKGROUND OF THE INVENTION

The rise of Internet attacks via computer viruses and other techniques has caused significant financial damage to many corporations. Current anti-virus software operates by comparing incoming files against a list of "offensive" code (e.g., known viruses). If a file looks like one of these offensive codes, then it is deleted and the system protected. There are several major problems with this approach, however, with regard to modern virus attacks.

First, if the virus is new and not in the list of known viruses, the anti-virus solution will not identify it is a virus and therefore it will not keep it from spreading. Second, modern worms such as "code red" and "SQL slammer" do not rely on any of the methods of transmission guarded by most virus protection systems. These new strands of viruses are designed to attack the computer system directly by exploiting faults in the software used by the computer to perform its operations. The viruses are therefore able to crack corporate networks and replicant without the intervention of anti-virus software.

Another critical factor in preventing anti-virus software from protecting modern networks is the speed of modern virus replication and propagation. Whereas years ago it could take years for a virus to disseminate across the United States, modern viruses can spread across the whole world in a matter of minutes.

At the root of the modern virus problem lies system management and maintenance. All network applications are vulnerable to some level of attack, but the software manufacturers work diligently to resolve these errors and release fixes to the problems before they can be exploited by virus producers. In fact, most of the time the application manufacturers have released the fixes to the application that would have prevented a virus from utilizing these holes before the viruses are even released. Unfortunately, due to the complexity of modern networks, most system administrators are unable to keep pace with the increasing number of security patches and hot fixes released from the software manufacturers on every computer in the network.

What is needed is a solution that automates the process of identifying and managing network application security holes. Typical solutions to this problem involve the user of multiple applications installed one various computers. These applications are executed when certain conditions occur. For example, a company may install several anti-virus components that each execute upon the detection of certain conditions. There are several problems, however, with this approach, especially when it relates to managing network application security holes. Each overall task (such as antivirus) typically requires multiple applications, each compiled together. This can make development and maintenance difficult, however, as changes to one application necessitate the recompiling of others. Additionally, the execution of multiple applications simultaneously can waste memory and processor resources. There may be no need for a particular application to run at a certain time, yet prior art solutions require that an application be run if it is compiled together with another application that is running.

What is needed is a solution that overcomes the drawbacks of the prior art.

BRIEF DESCRIPTION

An agent architecture may be provided with base functionality that allows it to run without executing any applications. The base application need not have any modules. When functionality is desired, modules may be added. The agent may receive policies and procedures from a controller, and executes the modules based on the policies and procedures. It may then return and report information. This allows a system to be designed that doesn't have to be recompiled upon changes to individual tasks or applications, which greatly eases development of new tasks and applications.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
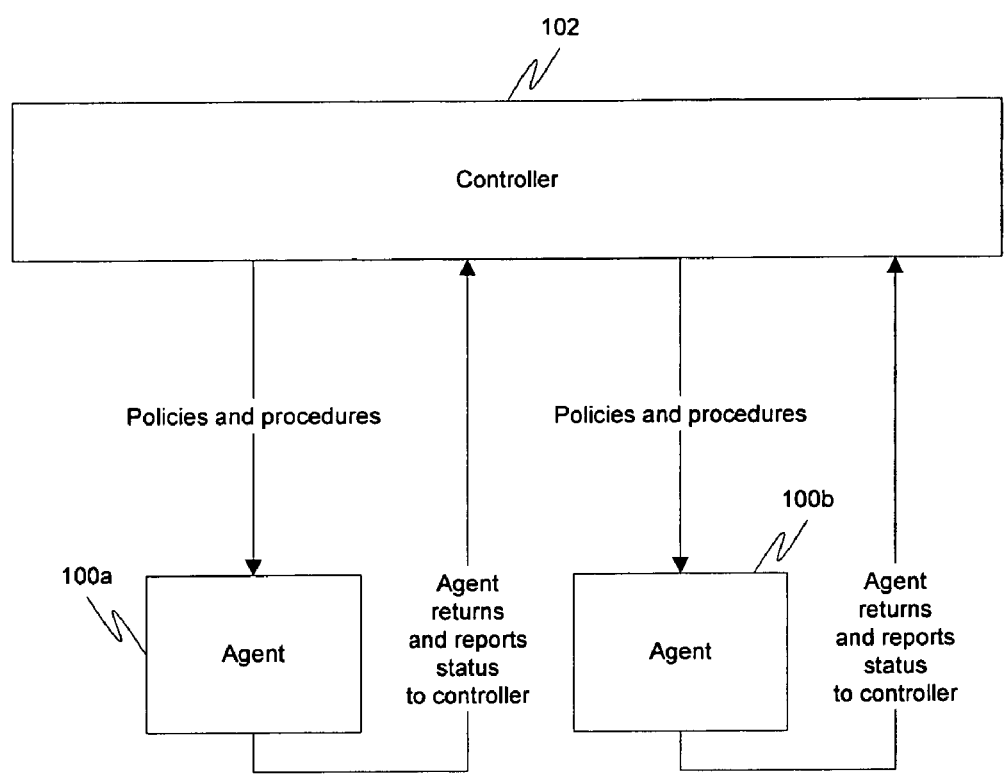
FIG. 1 is a block diagram illustrating an agent-based system in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention provides an agent architecture with base functionality that allows it to run without executing any applications. The base application need not have any modules. When functionality is desired, modules may be added. The agent may receive policies and procedures from a controller, and executes the modules based on the policies and procedures. It may then return and report information. This allows a system to be designed that doesn't have to be recompiled upon changes to individual tasks or applications, which greatly eases development of new tasks and applications.

In an embodiment of the present invention, the agent architecture may be made up of three parts: a main module, auxiliary modules, and modules settings.

The main module of the agent is the base application which, based on a configuration file, will dynamically load into memory assigned modules and utilize those modules to execute policies and procedures as they are received from a controller. The foundation of this design is that the main module is not aware of any tasks, functions, settings, controls, sub-functions, or procedures until it loads auxiliary modules into memory during the initiation phase of these applications. This design allows the agent to act as a shell for modules to execute policies and procedures from the controller.

By design, the agent may run without any modules loaded, but will not perform any task or make any communication to the controller. It is only by dynamically loading modules that the agent will know and understand what actions, tasks, procedures, or functions it may perform.

Auxiliary modules and modules settings are designed to perform all the actions, tasks, procedures, or functions that make up the agent. A module may be created as a separate dynamically loaded library and may be loaded into memory by the agent.

A module may contain module settings that can be defined in the configuration file. For example, a "Comms" module may have setting as follows:
<module name="comms" library="mod_comms.dll" entry="module_main@comms@@YAHPAV input@xp@@PAVoutput@3@1@Z" timeout="60">
    <interface-accept<
    <local addr="any" port="any"/>
<interface-accept>
<interface-connect>
    <local addr="any" port="any"/>
    <remote addr="192.168.1.1" port="8311"/>
<interface-connect>
</module>

In the above example, the module node contains a module name, the library for the module, and the entry point the agent uses to load the module into memory, as well as any additional information needed (e.g., the timeout setting).

In an embodiment of the present invention, the modules may communicate with each other using a full and a half-duplex connection: one conduit which the main module uses to write to the auxiliary module, one conduit which the auxiliary module uses to write to the main module, and one conduit for the auxiliary module to write diagnostic information. In essence, to each sub-module, the three conduits look like standard input, output, and error. The message structure may contain all information required to fully dispatch the message, thus there is no need for modules to keep a list of message states. In other words, besides some module-global information, modules need not keep state information, but rather may insert it into the message structure.

In an embodiment of the present invention, each message in the communication between auxiliary modules may be stack-based. The top most elements may specify which auxiliary module should next process the message, and the command for that auxiliary module to execute. This tuple (auxiliary module name and command) are the only required information in a message element. Each time an auxiliary module receives a message, the top element may be removed. If a message needs to be forwarded to another auxiliary module for further processing before the rest of the message is processed, the current auxiliary module may add the element to the top of the stack. If the message should return to the current auxiliary module after visiting the auxiliary module for further processing, the current module may add itself first to the top of the stack, then the other auxiliary module. If a response is appropriate for a command, the response may be placed within the new top-most element. When an auxiliary module has completed processing the command, it may send the message to the main module, which then dispatches it to the appropriate auxiliary module, unless the stack is empty, in which case the message has been fully processed, and no action is taken.

A description of some common auxiliary modules may be provided herein. One of ordinary skill in the art will recognize, however, that these are merely examples, and the claims should not be limited to these examples except where specifically stated.

As described briefly above, a communications, or "comms" module may be provided. This module may be responsible for communicating with external entities such as the user interface, other agents, or the controller.

A policy module may be provided to keep a number of policies relating to the functioning of the modules. In an embodiment of the present invention, this may include keeping a number of reoccurring and single use timers which, after expiration, trigger a message to be sent to main. it is the content of the message that causes a package to be installed or an asset scan to occur. Therefore, for a policy to be useful, one must know the message to associate with the time.

A package module may be provided for installing packages. This action varies greatly from the agent and controller, and will be described in detail herein. Packages initially may reside on a Global Update Repository (GUR). When an agent requests a package, the controller may download it and cache it locally before relaying it to the agent.

The package structure may comprise at least two parts: the header, and the files. The header may contain all information on the contents of the package, how to install the package, and what results to expect from the installation process. The files are what are used to install the package. Examples include MSI executables, shell scripts or batch files, .tar.gz archives, and unified diff .patch files.

There may be two types of packages: custom packages, and GUR packages. Custom packages may be uploaded by a user to a specific controller from the user interface. The user may specify the file to be distributed and the command line parameters used to execute the file. The custom package is then available to be distributed through the custom package area of the user interface. A GUR package is created by a centralized GUR team and may be distributed through the GUR to the controller.

In an embodiment of the present invention, the package module's duties revolve around maintaining six lists of packages, enumerated below, representing the various states of installation.

The first state of installation is "available". The scan module may populate the available list by scanning the local system and sending information on available packages to this module. Packages become available to an agent based on the findings of the scan module, which is described in more detail later in this document. if a package is in the installed list, the package module defers to the Scan Module's intelligence and re-lists the package as available. This accounts for the case of where a package is removed from outside of the environment. if the package resides on any other list, it may be ignored. Otherwise, the package may be added to the available list.

The second state of installation is "scheduled". From the user interface, administrators may specify that a particular package is to be installed at a certain time, on a certain data. Such packages may be transitioned from the available list to the scheduled list. Upon insertion to the scheduled list, the package module may create a new policy in the policy module. When the schedule expires, or the specified time for the scheduled packages has expired, the policy module may notify the package module, the package may move to the pending list. If a package is scheduled for an impossible data (for example, in the past), the agent may act as if the scheduled time has elapsed and move the packages to the pending list.

The third state of installation is "waiting". The waiting list may contain available modules that have been marked as "auto install". "Auto install" is performed by a specific policy, configurable on a website. Packages may be moved from the waiting list to the pending list through manual action by a user or when a policy expires for the necessary agent.

The fourth state of installation is "pending". The pending list may contain all packages that are currently being downloaded from the controller. When download of all the parts is complete, the package maybe moved to the processing list. If not all parts of the package can be obtained, those retrieved may be cached at the agent, and the package may be moved to the failed list.

The fifth state of installation is "processing". One at a time, packages on this list may be installed according to the parameters stored in an app-pack file. Once installation has successfully complete, the package may be moved to the installed list. If any part of the installation process fails per the parameters stored in the app-pack header, the installation process may be terminated and the package may be moved to the failed list.

The sixth state of installation is "failed". The failed list may contain packages that failed at some point in the entire process. One example of this is if a request package was not found on the GUR. Another example is if the proper execution commands were not assigned to the script node in the app-pack. Another example is if the transfer of the package from the controller to the agent was interrupts and is unable to resume. When a patch has failed from this point, packages may be rescheduled, re-listed as waiting, or returned to the available list.

Turning back to the commonly-used modules, a controller package module may also be provided. The controller's role with packages is to cache packages available fro the GUR, store custom packages uploaded from the user interface, and to deliver package headers and package files to the agents, upon request. When an agent request a package, if it is available in the cached or custom store, its header is immediately returned and its files are made available for download through an external connection such as HTTP or FTP. if the package does not exist locally, it may be requested from the GUR via HTTP. If even the GUR doesn't have it, the controller may reply to the agent that the package could not be found and the package is moved to the failed list.

An asset module may report on what hardware and software components are installed on the local system. it may be used by, or make use of, the scan and package modules to maintain an accurate and consistent data set.

The scan module may be responsible for reporting to the package module what packages are available for the local system. It may use the package module to retrieve the scan-definitions file that details how to scan for packages based upon the local system. Once the scan module has received and mapped to the proper scan-definitions file, the scan process may determine if any packages are available for the agent.

FIG. 1 is a block diagram illustrating an agent-based system in accordance with an embodiment of the present invention. Each agent 100*a*, 100*b* may reside on a different node of the network. A controller 102 may be located centrally. The centralized controller 102 may send policies and procedures to be executed upon by dynamically loaded modules to the agents 100*a*, 100*b*. The agents 100*a*, 100*b* may then execute the assigned module based upon the policies and procedures assigned to it in an autonomic fashion. Upon completion of the assigned policies and procedures, the agent may return and report the status to the controller 102.

Figure 2:
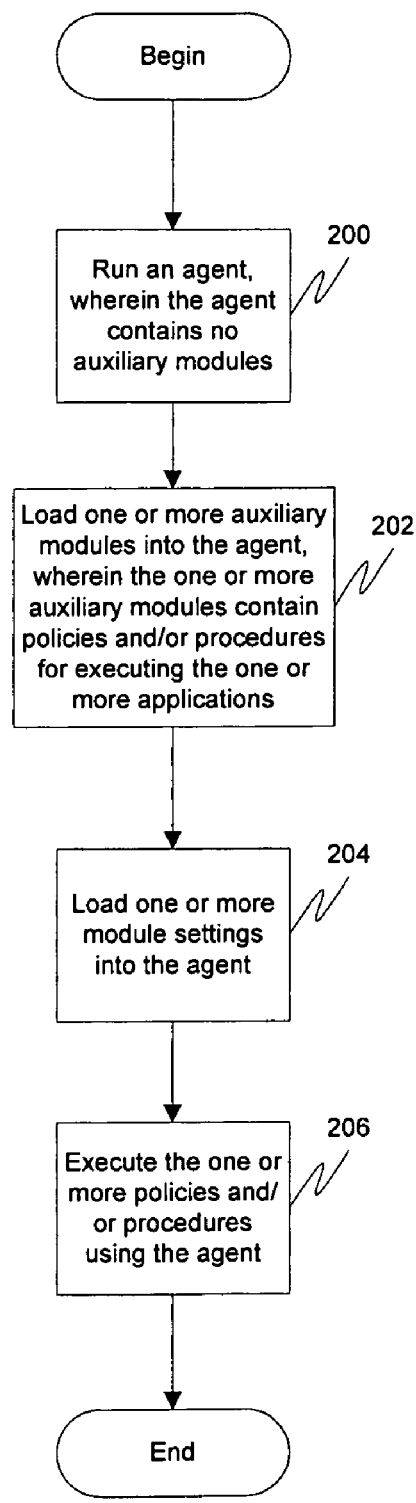
FIG. 2 is a flow diagram illustrating a method for executing one or more applications in a computer system in accordance with an embodiment of the present invention.

FIG. 2 is a flow diagram illustrating a method for executing one or more applications in a computer system in accordance with an embodiment of the present invention. At 200, an agent may be run, wherein the agent contains no auxiliary modules. The agent does not contain any information regarding the one or more applications until auxiliary modules are loaded. At 202, one or more auxiliary modules may be loaded into the agent, wherein the one or more auxiliary modules contain policies and/or procedures for executing the one or more applications. At 204, one or more module settings may be loaded into the agent. At 206, the policies and/or procedures may be executed using the agent. During this act, the one or more module settings maybe applied to the policies and/or procedures. The agent may contain a main module, and the main module and any loaded auxiliary modules may communicate using three conduits: one for communication from the main module to the auxiliary modules, one for communication from the auxiliary modules to the main module, and one for the auxiliary modules to write diagnostic information. These conduits may represent a full and a half duplex connection.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method for executing one or more applications in a computer system, the method comprising:

by a device having a memory, running an agent initially having a main module but no auxiliary modules;

receiving a package from a controller configured to manage a plurality of devices, the package comprising one or more auxiliary modules, the controller configured to cache packages commonly and initially available from a global update repository for the plurality of devices prior to relaying the package to the device;

responsive to the receiving, loading the one or more auxiliary modules into the memory, wherein the one or more auxiliary modules comprise one or more of policies and procedures for executing the one or more applications; and executing the one or more of policies and procedures using the agent;

wherein the loading provides the main module with tasks, functions, settings, controls, sub-functions, or procedures required for executing the one or more applications, and wherein the main module has no other auxiliary modules during the initiation phase of the one or more applications until the auxiliary modules are loaded.

2. The method of claim 1, wherein the agent contains no information regarding the one or more applications until the one or more auxiliary modules are loaded.

3. The method of claim 1, further comprising loading the one or more module settings into the agent.

4. The method of claim 3, wherein the executing includes applying the one or more module settings to the one or more of policies and procedures during execution.

5. The method of claim 1, wherein the main module and auxiliary modules communicate using three conduits, one for communication from the main module to the auxiliary modules, one for communication from the auxiliary modules to the main module, and one for the auxiliary modules to write diagnostic information.

6. The method of claim 5, wherein the conduits represent a full and a half duplex connection.

7. An apparatus for executing one or more applications in a computer system, the apparatus comprising:
   a memory;
   an agent initially having a main module but no auxiliary modules;
   wherein the agent is configured to receive a package from a controller configured to manage a plurality of devices, the package comprising one or more auxiliary modules, the controller configured to cache packages commonly and initially available from a global update repository for the plurality of devices prior to relaying the package to the device;
   wherein the agent is further configured to, responsive to receiving the package, load the auxiliary modules into the memory and execute one or more policies or procedures stored within the auxiliary modules; and
   wherein the loading provides the main module with tasks, functions, settings, controls, sub-functions, or procedures required for executing the one or more applications, and
   wherein the main module has no other auxiliary modules during the initiation phase of the one or more applications until the auxiliary modules are loaded.

8. An apparatus for executing one or more applications in a computer system, the apparatus comprising:
   a memory;
   means for running an agent initially having a main module but no auxiliary modules;
   means for receiving a package from a controller configured to manage a plurality of devices, the package comprising one or more auxiliary modules, the controller configured to cache packages commonly and initially available from a global update repository for the plurality of devices prior to relaying the package to the device;
   means for, responsive to the receiving, loading one or more auxiliary modules into the memory, wherein the one or more auxiliary modules comprise one or more of policies and procedures for executing the one or more applications; and
   means for executing the one or more of policies and procedures using the agent;
   wherein the loading provides the main module with tasks, functions, settings, controls, sub-functions, or procedures required for executing the one or more applications, and
   wherein the main module has no other auxiliary modules during the initiation phase of the one or more applications until the auxiliary modules are loaded.

9. The apparatus of claim 8, wherein the agent contains no information regarding the one or more applications until the one or more auxiliary modules are loaded.

10. The apparatus of claim 8, further comprising means for loading one or more module settings into the agent.

11. The apparatus of claim 10, wherein the means for executing includes means for applying the one or more module settings to the one or more of policies and/or procedures during execution.

12. The apparatus of claim 8, wherein the main module and auxiliary modules communicate using three conduits, one for communication from the main module to the auxiliary modules, one for communication from the auxiliary modules to the main module, and one for the auxiliary modules to write diagnostic information.

13. The apparatus of claim 12, wherein the conduits represent a full and a half duplex connection.

14. A nontransitory program storage device readable by a machine, tangibly embodying a program of instructions executable by the machine to perform a method for executing one or more applications in a computer system, the method comprising:
   by the machine, running an agent initially having a main module but no auxiliary modules;
   receiving a package from a controller configured to manage a plurality of devices, the package comprising one or more auxiliary modules, the controller configured to cache packages commonly and initially available from a global update repository for the plurality of devices prior to relaying the package to the device;
   responsive to the receiving, loading one or more auxiliary modules into the memory, wherein the one or more auxiliary modules comprise one or more of policies and procedures for executing the one or more applications; and
   executing the one or more of policies and procedures using the agent;
   wherein the loading provides the main module with tasks, functions, settings, controls, sub-functions, or procedures required for executing the one or more applications, and
   wherein the main module has no other auxiliary modules during the initiation phase of the one or more applications until the auxiliary modules are loaded.

* * * * *